(No Model.) A. LINDGREN. 2 Sheets—Sheet 1.
SEEDING MACHINE.
No. 516,019. Patented Mar. 6, 1894.
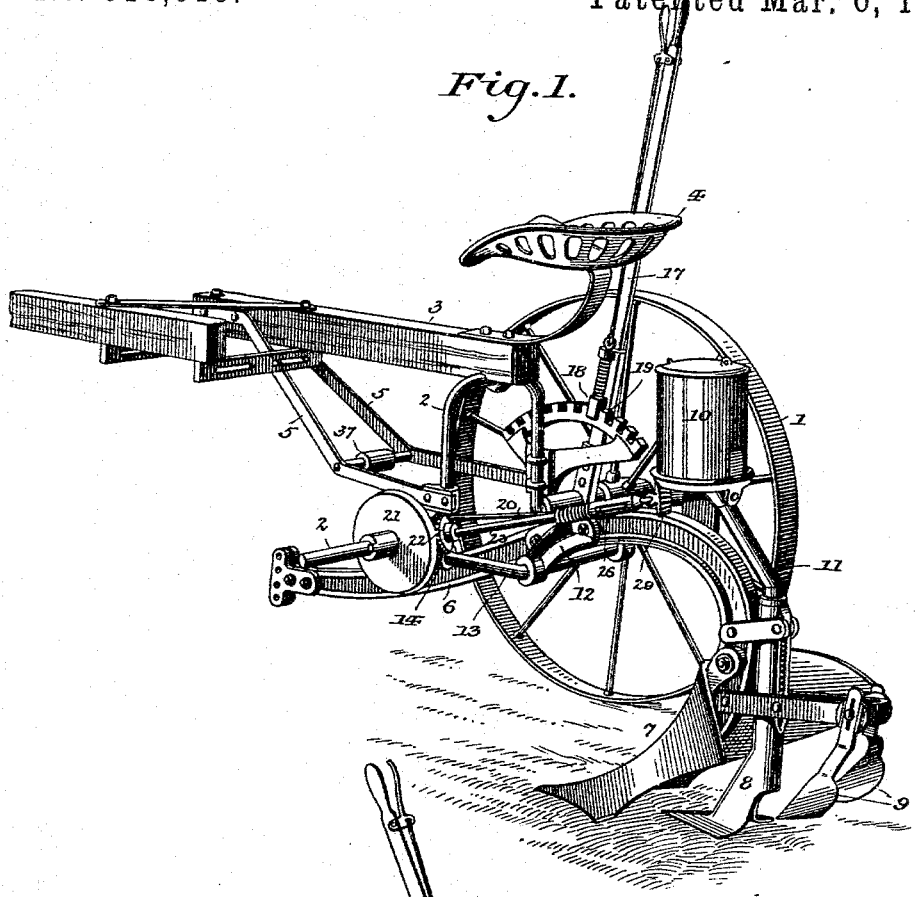
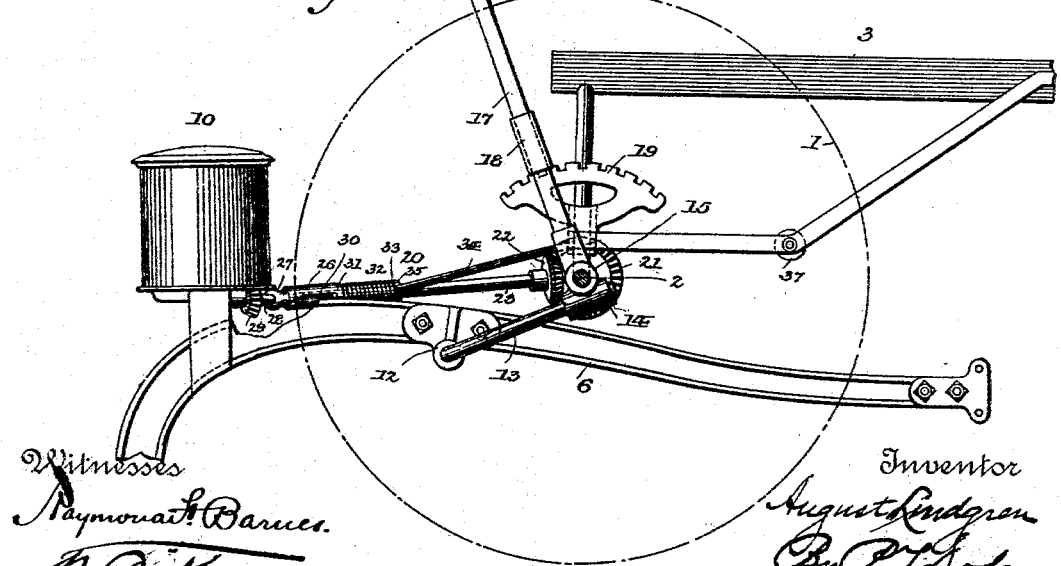

(No Model.) 2 Sheets—Sheet 2.

A. LINDGREN.
SEEDING MACHINE.

No. 516,019. Patented Mar. 6, 1894.

Witnesses
Raymond F. Barnes.
W. R. Kennedy.

Inventor
August Lindgren
By O. F. Dodge
Attorney

UNITED STATES PATENT OFFICE.

AUGUST LINDGREN, OF MOLINE, ILLINOIS, ASSIGNOR TO THE MOLINE PLOW COMPANY.

SEEDING-MACHINE.

SPECIFICATION forming part of Letters Patent No. 516,019, dated March 6, 1894.

Application filed October 12, 1893. Serial No. 487,947. (No model.)

*To all whom it may concern:*

Be it known that I, AUGUST LINDGREN, of Moline, county of Rock Island, and State of Illinois, have invented a new and useful Improvement in Seeding-Machines, of which the following is a specification.

My invention relates to that class of seeding machines known in the art as "Lister" drills in which the seed dropping and covering mechanisms are sustained by the plow beam, the seed dropping mechanism being driven by suitable gearing from the ground wheels.

My invention consists in combining with a seed dropping mechanism sustained by and movable with the plow beam, a rotary shaft driven from the ground wheels and adapted to be moved longitudinally and disengaged when the beam is raised.

The invention also consists in the details of construction and combination of parts hereinafter described and claimed.

Figure 4:
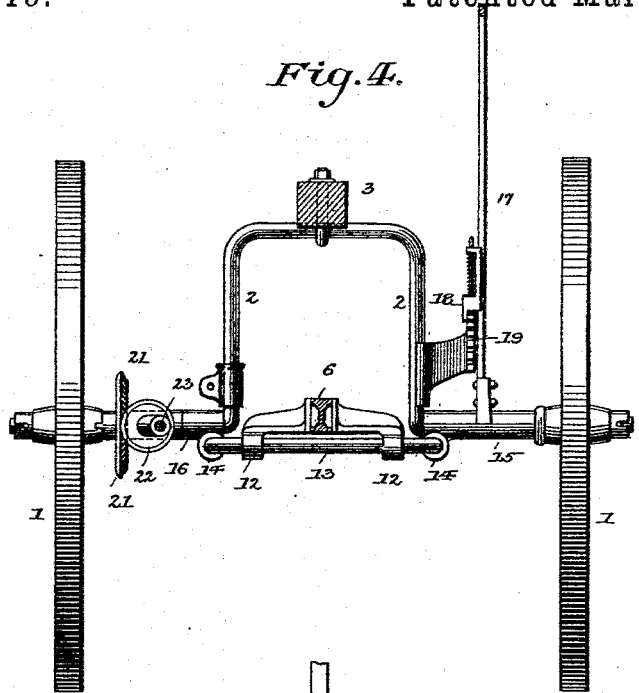
Figure 3:
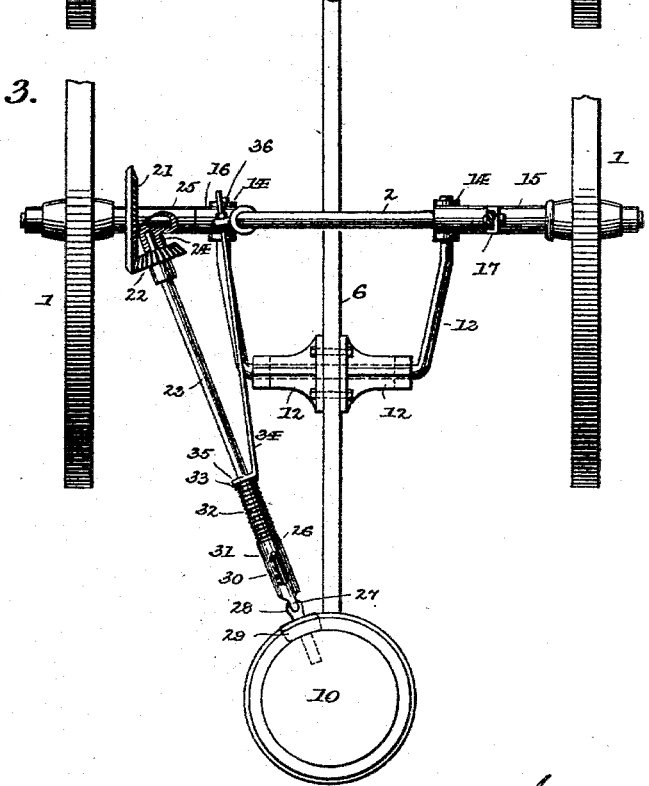

In the accompanying drawings, Figure 1, is a perspective view of the machine having my invention embodied therein, one of the ground wheels being removed to expose to view other parts. Fig. 2, is a vertical longitudinal sectional elevation of the same, the ground wheels and other parts being removed. Fig. 3, is a top plan view of the principal parts of the frame and the driving connections. Fig. 4, is a rear sectional elevation of the same.

Referring to the drawings, 1 represents the ground wheels which are mounted loosely on the horizontal ends of an arched axle 2.

3 represents a tongue connected to the elevated horizontal portion of the axle and sustaining the driver's seat 4. The tongue is further connected to the axle and braced by bars 5 connected thereto and to the uprising portions of the axle as plainly shown.

6 represents a plow beam extending as usual in a fore and aft direction between the wheels and sustained in the manner more fully described hereinafter. At its rear end the beam sustains a double moldboard plow 7, subsoiler 8, coverers 9, and a seed box 10 containing seed dropping mechanism adapted to deliver the seed through a tube 11 extending to the subsoiler.

The foregoing parts may be of the usual and ordinary construction, and except in so far as hereinafter indicated, they form no part of the present invention.

The plow beam is provided at opposite sides with lateral arms 12, bolted thereto and have formed in their ends openings or bearings to receive a bail 13, the parallel ends of which extend forward and are fixed within sleeves 14 attached rigidly to the under sides of sleeves 15 and 16, encircling the horizontal ends of the axle at the inner sides of the ground wheels. From this description it will be seen that as the sleeves to which the ends of the bail are connected are turned on the axle, the opposite end of the bail will be raised or lowered as the case may be, and owing to the connection with the beam, the latter will be correspondingly raised or lowered, and be caused at the same time to move bodily forward and backward with relation to the axle. This movement of the beam to elevate or depress the plow is effected by hand lever 17, connected at its lower end rigidly to the sleeve 15, and provided with a locking dog 18 in position to engage teeth on a segment plate 19, fixed to the uprising portion of the arched axle as shown.

The seed dropping mechanism is driven from one of the ground wheels by intermediate driving connections 20 of such construction that on the elevation of the beam, these connections will be automatically rendered inoperative, thereby causing the operation of the seed dropping mechanism to cease. To effect this action I adopt the construction shown more particularly in Figs. 2 and 3 of the drawings, in which it will be seen that at one end the arched axle is loosely encircled by a hub having formed thereon a driving gear 21, the said hub being clutched to the ground wheel to turn therewith. This driving gear is in position to engage a beveled gear 22 mounted on a shaft 23, having its end seated loosely in a socket formed in a boss 24, extending laterally from a sleeve 25, loosely encircling the axle between the sleeve 16 and the driving gear, the construction being such that the end of the shaft may be moved within the socket to cause the disengagement of the beveled gear thereon with the driving gear. The shaft 23 extends rearward obliquely toward the seed dropping mechanism, where its end is fitted loosely within a tube or cylinder 26, provided with an eye 27, interlocked with an eye 28 formed on a pinion 29, driving the seed dropping mechanism, the construction described constituting the familiar and well known gimbal joint. The cylinder is formed with a slot 30, adapted to receive a pin 31 on the shaft by which the relative movements of the parts are limited. The shaft is encircled by a spiral spring 32, bearing at its opposite ends against the end of the cylinder and a washer or stop 33 fixed to the shaft, the said spring tending to hold the end of the shaft forward within its socket, and thus maintain the engagement of the gear wheels. From this description it will be seen that as the plow beam sustaining the seed dropping mechanism is moved bodily back and forth as it is raised and lowered by the lever, the distance between the axle and the seed dropping mechanism will be correspondingly increased and diminished, which movements owing to the form of the connections between the driving gear and the seed dropping mechanism, will cause the shaft carrying the beveled gear 22 to be withdrawn rearwardly within its socket, thereby disengaging the said wheel from the driving gear, or will cause the shaft to be moved forward within the socket to cause the engagement of said gears as the case may be. The form and relative proportions of these connections and their arrangement with respect to the beam elevating and depressing devices are such that when the beam is in a depressed position, the shaft 23 will be projected by the spiral spring forward within the socket and the engagement of the gears effected to operate the seed dropping mechanism; and when the beam is elevated, the distance between the seed dropping mechanism and the axle increasing, the cylinder will slide longitudinally of the shaft and encountering the pin 31 thereon will draw the shaft rearward within its socket, and cause the disengagement of the gears, thereby rendering the seed dropping mechanism inoperative. It will be noted that the action of the parts as regards the engagement and disengagement of the driving connections is automatic, and that while the plow is operating in the ground to prepare the soil to receive the seed, the seed dropping mechanism will be operating, but on the elevation of the plow for turning or for transportation, the operation of the seed dropping mechanism will be automatically arrested.

While the construction described has been found to effect the automatic disengagement of the seed dropping mechanism in a practical manner, I propose in certain cases to provide a rod 34 having at one end an eye 35, which loosely surrounds the shaft 23 in advance of the washer. The opposite end of the rod is jointed above the shaft to a plate or web 36 cast on the sleeve 15, and an upward continuation of the same. Under such a construction it will be seen that when the beam is raised, the washer on the shaft will be engaged by the end of the rod, and the shaft will be moved positively thereby rearward and disengaged from the driving pinion. When the beam is lowered again, the spiral spring will project the shaft forward into engagement with the gear. As a result of this arrangement I am enabled to use the plow when the wheels are below the bottom line of the share. In other words, the plow may be in operation on a ridge, while the wheels will travel below it. Further it has been found that the disengagement of the shaft will be effected more quickly than if the rod 34 were omitted.

In order to prevent the plow from dropping to the ground after it has been elevated, I provide a stop 37 which is fixed between the two draft rods before alluded to in position to encounter the forward end of the beam.

Having thus described my invention, I claim—

1. The combination of the ground wheels, the axle on which they are mounted, the plow beam adapted to be raised and lowered, the seed dropping mechanism sustained by the beam, the rotary shaft driven by the ground wheels and connected to the seed dropping mechanism and adapted to be moved longitudinally and disengaged when the beam is raised; whereby the seed dropping mechanism is automatically rendered inoperative on the elevation of the beam.

2. The combination of the ground wheels, the axle on which said wheels are mounted, the plow beam adapted to be raised and lowered and movable bodily back and forth, the seed dropping mechanism sustained by the beam, the longitudinally movable rotating shaft connected thereto at one end, the gear on the opposite end of the shaft, and the driving gear arranged to mesh with the first named gear, and to be separated therefrom as the shaft is moved longitudinally.

3. The combination of the ground wheels, the axle on which said wheels are mounted, the plow beam adapted to be raised and lowered and movable bodily back and forth, the seed dropping mechanism sustained by the beam, the longitudinally movable rotating shaft connected thereto at one end by a gimbal joint, the gear on the opposite end of the shaft and the driving gear arranged to mesh with the first named gear and to be separated therefrom as the shaft is moved longitudinally.

4. The combination with the driving gear and the seed dropping mechanism movable bodily back and forth, of the longitudinally movable rotating shaft, the beveled gear fixed thereon and in position to be operated by the driving gear, the cylinder mounted on the rotating shaft and movable longitudinally with relation thereto and connected to the seed dropping mechanism, means for limiting the movement of the cylinder, and the spring acting on the shaft and tending to maintain the engagement of the gears.

5. The combination of the axle, the ground wheels, the beam sustained by the axle to swing upward and downward, the lever for moving the beam, the seed dropping mechanism sustained by the beam, the driving gear operated by the ground wheel, the longitudinally movable rotating shaft, the beveled gear fixed at one end in position to mesh with the driving gear, the cylinder within which the opposite end of the shaft is loosely mounted, said cylinder provided with a slot, the pin on the shaft extending in the slot, the spring encircling the shaft and tending to project the same forward the pinion for operating the seed dropping mechanism, and the gimbal joint connecting the cylinder with the pinion.

6. The combination of the axle, the driving gear, the sleeve loosely encircling the axle and provided with the socket, the beam, the seed dropping mechanism sustained thereby and adapted to be moved bodily back and forth as the beam is raised and lowered, the shaft having its forward end seated loosely in the socket, the beveled gear fixed to the shaft in position to engage the driving gear, the longitudinally movable cylinder at the opposite end of the shaft connected to the seed dropping mechanism, means for limiting the longitudinal movement of the cylinder, and means tending to project the shaft forward within the socket.

7. The combination of the axle, the ground wheels, the beam sustained by the axle to swing upward and downward, means for moving the beam, the driving pinion operated by the ground wheel, the longitudinally movable rotating shaft, the beveled pinion fixed at one end of the shaft in position to mesh with the driving pinion, the cylinder within which the opposite end of the shaft is loosely mounted, connections between the cylinder and shaft constructed to admit of both a sliding and a rotating movement of the latter and to limit its motion in the same, the rod jointed at one end and having its opposite end arranged adjacent to the shaft, the spring on the shaft between the end of the cylinder and the rod, and a gimbal joint connecting the cylinder with the pinion.

8. The combination of the axle, the ground wheels, the beam adapted to be raised and lowered, the seed dropping mechanism sustained by the beam, the longitudinally movable rotary shaft driven from the ground wheels and connected to the seed dropping mechanism, the rod jointed at one end above the rotary shaft and having its opposite end in position to engage the same and move it rearward, and the spring arranged to project the shaft forward; whereby when the beam is raised the shaft by its engagement with the rod will be caused to move longitudinally and be disengaged.

In testimony whereof I hereunto set my hand, this 20th day of June, 1893, in the presence of two attesting witnesses.

AUGUST LINDGREN.

Witnesses:
F. G. ALLEN,
A. W. WAY.